Nov. 19, 1946.   B. BOGOSLOWSKY   2,411,244
COLLAPSIBLE TUBE
Filed Aug. 19, 1944   2 Sheets-Sheet 2

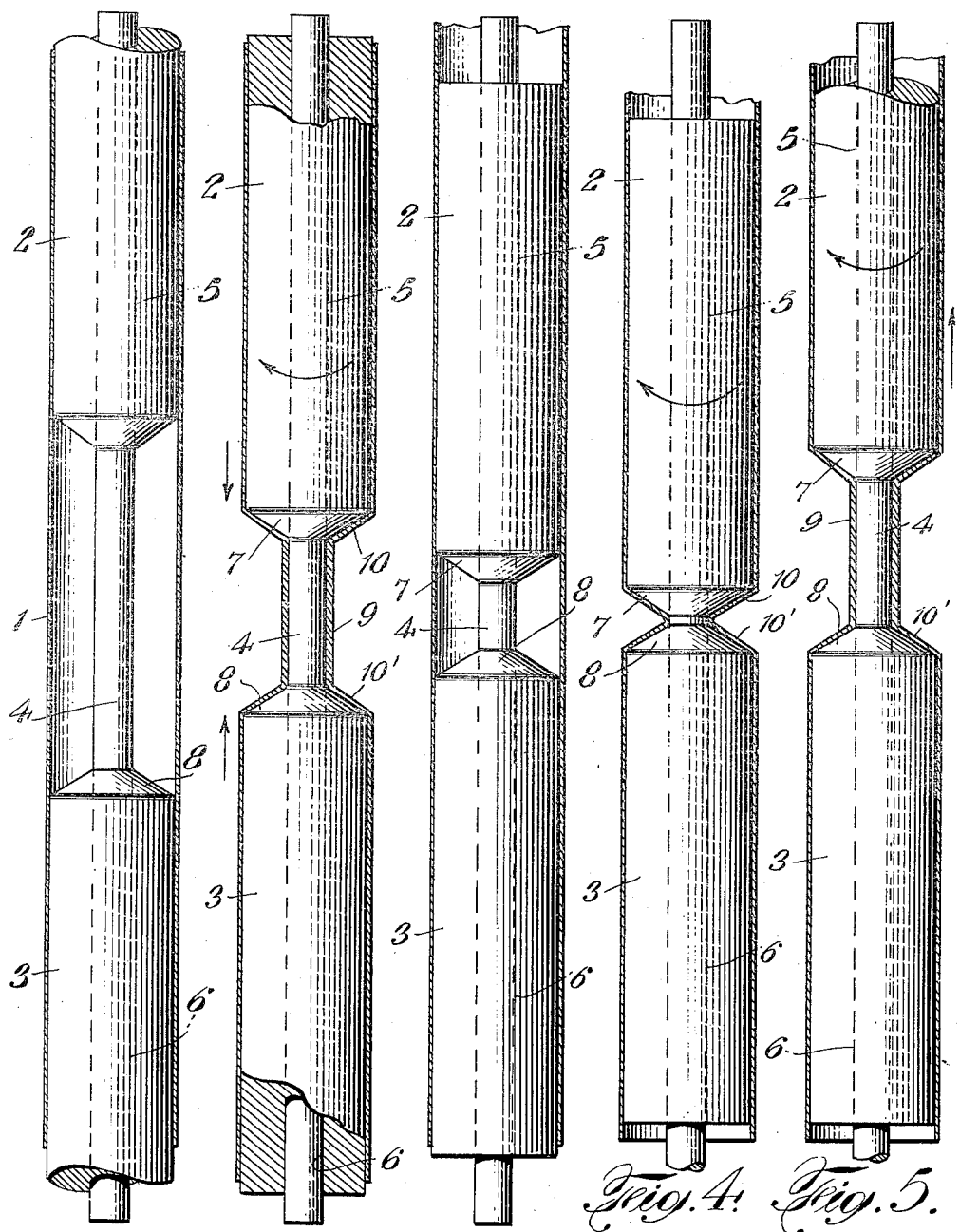

INVENTOR
Boris Bogoslowsky
BY Emery, Varney, Whittemore &
ATTORNEY

Patented Nov. 19, 1946

2,411,244

UNITED STATES PATENT OFFICE 2,411,244

COLLAPSIBLE TUBE

Boris Bogoslowsky, Jackson Heights, N. Y.

Application August 19, 1944, Serial No. 550,238

11 Claims. (Cl. 93—36.8)

This invention relates to collapsible tubes and to methods for the manufacture thereof.

This application is a continuation in part of my copending application Serial No. 473,322, filed January 23, 1943.

It is an object of the invention to provide a collapsible tube made of materials in sheet or film form as hereinafter described, as a substitute for the extruded metal collapsible tubes now in common use.

Other objects and advantages of the invention will appear hereinafter.

A preferred embodiment of the invention selected for purposes of illustration is shown in the accompanying drawings, in which, Figure 1 is a front elevation, partly in section, showing the mandrels in position to begin the shaping operation.

Figure 2 is a similar view showing a later stage in the shaping operation.

Figures 3, 4 and 5 are similar views showing an alternative method of procedure.

Figure 6:
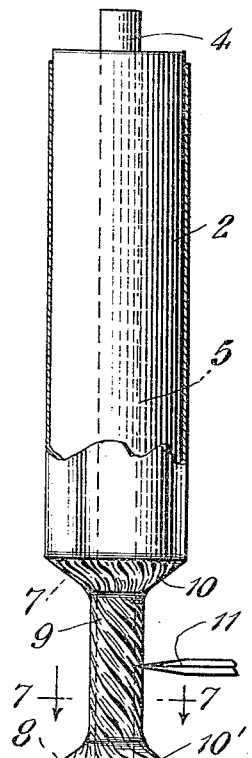
Figure 6 is a front elevation showing the embryo tubes on completion of the shaping operation.

As materials for use in the manufacture of collapsible tubes according to my invention, I may use many of the plastic films or sheets now available in the commercial market, as for example, the various cellulose base films such as the commercial product "Cellophane," or resin base films such as the commercial product "Vinylite," or rubber base films such as the commercial product "Plicfilm." Or I may use paper, metal foil or other sheet materials for some purposes. The selection of a suitable material will depend entirely on the nature of the contents to be packaged in the tube formed therefrom, but for most purposes I prefer to use material which is thermoplastic or heat sealing for reasons which will be apparent hereinafter. If paper, metal foil or other sheet materials which are not thermoplastic or heat sealing are used, such materials should preferably be coated or laminated with thermoplastic or heat sealing materials. For example, I have found that aluminum foil, coated on both sides with "Vinylite" (vinyl ester resin) is admirably suited to use in the manufacture of collapsible tubes in accordance with the invention hereinafter described.

In practicing the invention hereinafter described I prefer to start with the sheet or film material in the form of cylindrical tubular blanks cut to the desired length. It is possible to obtain some of the above-named plastic films or sheets in the form of seamless tubing, and I may employ such tubing in carrying out my invention. However, it is cheaper and for most purposes more satisfactory to form cylindrical tubular blanks from flat sheet or strip material, either by convolute winding or by spiral winding, and sealing the windings in any suitable manner as by application of heat and pressure in the case of thermoplastic or heat sealing materials. Such tubular blanks may consist of one or more plies, depending on the nature of the material. The formation of such tubular blanks forms no part of the present invention.

According to the present invention, I first shape such a tubular blank to provide an embryo tube having a shoulder and an elongated tubular neck integral with the tubular body in which said shoulder and tubular neck consist of folded material, preferably in the form of spirally wound folds in which the folds of the neck are continuations of the folds of the shoulder. Then I subject said elongated tubular neck to longitudinal pressure to compress the neck material to shorten and thicken the same to provide a finished neck of substantial strength and rigidity. At the same time I may subject the shoulder to pressure to smooth the folds thereof.

Referring to Figures 1 and 2, as a preferred method of shaping the tubular blank to provide an embryo tube, I place such a tubular blank 1 of the selected material on a pair of spaced cylindrical mandrels 2 and 3, said mandrels being aligned axially by a co-axial spindle 4 extending into passages 5 and 6 through said mandrels. The said spindle should fit snugly in said passages, but at least one of said mandrels, and preferably both of said mandrels, should be permitted to rotate on said spindle and to slide longitudinally thereon.

After placing the blank on the mandrels as shown in Figure 1, with the opposed ends of the mandrels spaced apart a predetermined distance, as shown, the ends of the blank are clamped to the respective mandrels by any suitable means, and the mandrels are rotated relative to one another, i. e. one mandrel is rotated in clockwise direction and the other mandrel is rotated in counter-clockwise direction as indicated in Figure 2, or alternatively, one of the mandrels may be held stationary and the other mandrel rotated relative thereto. Such relative rotation twists the unsupported portion of the tubular blank lying between the mandrels, causing the same to pucker inwardly toward the spindle, the mandrels being moved axially toward each other as the twisting movement continues.

Figure 7:
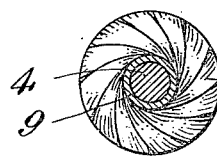
Figure 7 is a sectional view on the line 7—7 of Figure 6.

The twisting movement causes the unsupported material to form itself into a multiplicity of small spiral folds, and continued twisting movement causes the spirally folded material to wind itself tightly around the spindle 4 (Figure 2) and to lie tightly against the opposed end surfaces 7 and 8 of the mandrels, which in the preferred embodiment illustrated, are of conical form. Thus, as shown in Figures 6 and 7, the spiral folds begin at the periphery of one mandrel, for example, the mandrel 2, extend inwardly along the conical surfaces 7 with the fold lines extending in a direction tangent to the neck, then extend spirally around the spindle to the conical surface 8, and then extend outwardly along the conical surface 8 to the periphery of the other mandrel 3.

The tubular layer 9 of material which is spirally wound on the spindle, and which provides the material for the formation of the neck of the finished tube as hereinafter explained, is, due to such spiral winding, of a thickness greater than the wall thickness of the tubular blank, and the folded material 10, 10' which abuts the end surfaces of each of the mandrels, and which constitutes the shoulder of the finished tube, increases in thickness from the periphery of the blank to the point of juncture with the tubular layer 9.

An alternative method of proceeding is shown in Figures 3, 4 and 5. In this case a tubular blank 1 is placed on the mandrels as before, but the mandrels, as shown in Figure 3, are more closely spaced than in Figure 1. Again, the mandrels are rotated relative to one another, but for convenience in the following description, it will be assumed that the lower mandrel 3 is held stationary and that the upper mandrel 2 is rotated relative thereto. In this case the tubular blank is clamped tightly to one mandrel, say the lower mandrel, but is not clamped tightly to the other mandrel, being merely held in such manner as to cause the upper end of the blank to rotate with the mandrel, while allowing the blank to creep longitudinally of the mandrel as hereinafter described. This may be done, for example, by using rollers (not shown) as the blank holding means.

After placing the blank on the mandrels, the upper mandrel is rotated to twist the unsupported portion of the blank to cause the same to pucker inwardly as shown in Figure 4, the upper mandrel being moved toward the lower mandrel during this portion of the operation. On arriving at the position shown in Figure 4, and while continuing the rotation of the upper mandrel, the upper mandrel is backed away from the lower mandrel, while allowing the blank to creep longitudinally of the upper mandrel. In this manner the material is again twisted tightly around the spindle 4 as shown in Figure 5, and by controlling the rate at which the mandrel is backed away relative to the rate of rotation thereof, the thickness of the spirally wound layer 9 may be controlled, and in cases where a thicker layer may be desirable, it may be readily obtained in this manner.

Except for such variation in thickness, the result of both methods of procedure is identical, and as illustrated in Figure 6, consists in the formation of two embryo tubes in one operation, each consisting of a tubular body portion, a shoulder of spirally folded material, and an elongated neck of spirally wound material, all of said parts being formed integrally from a single tubular blank. The next step, therefore, is to sever the two embryo tubes by cutting through the neck portion near the middle thereof in any suitable manner, as by the knife 11.

The elongated common spindle 4 is now removed from the mandrels, and a shorter spindle 12 is inserted in each mandrel for purposes hereinafter described. A mandrel, as for example the mandrel 2, carrying an embryo tube is then inserted in a press having opposed plates 13 and 14, one of said plates carrying a die 15 having a cavity 16 therein. The said cavity has slightly tapering walls 17 and has a conical surface 18 adapted to cooperate with the conical end surface of the mandrel to form the shoulder of the tube. At the bottom of the cavity 16 is a smaller cavity 19 adapted to receive the elongated neck of the embryo tube, said cavity having a threaded wall adapted to form a thread on the neck of the finished tube. There is also a passage 20 through the die into which the spindle 12 is fitted.

Figure 8:
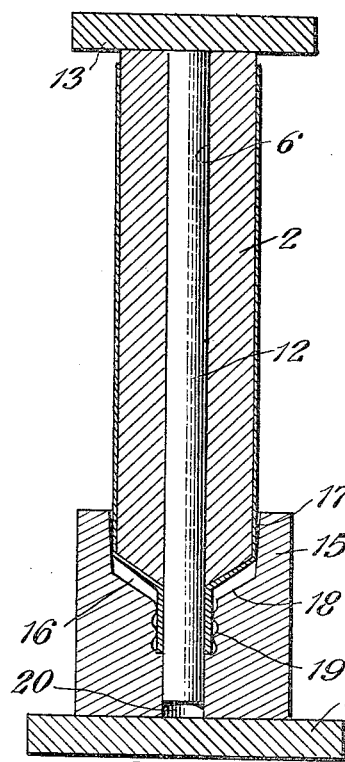
Figures 8 and 9 are sectional views showing the method of applying longitudinal pressure to form a finished tube.
Figure 9:
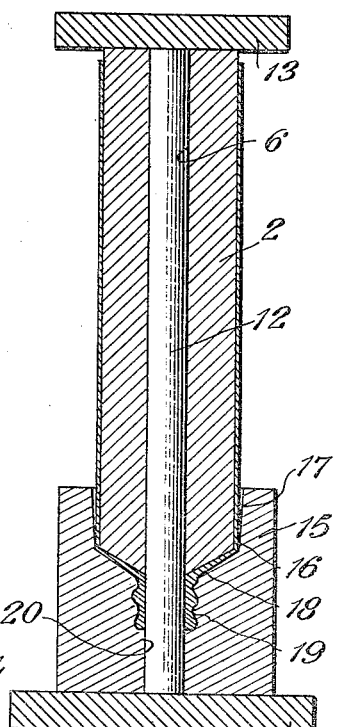
Figure 10:
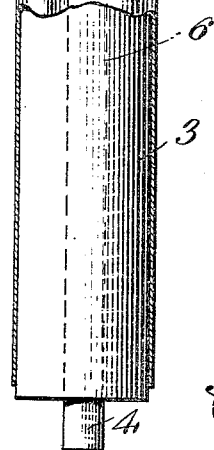
Figure 10 is an enlarged detail sectional view of the same.
Figure 11:
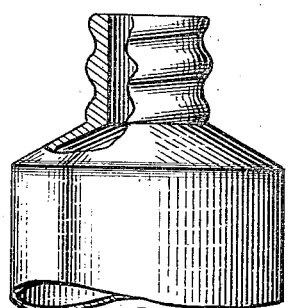
Figure 11 is a front elevation, partly in section of a finished tube.

When the mandrel is inserted in the press as shown in Figure 8, the outside diameter of the neck is less than the inside diameter of the threaded cavity 19, but the length of the neck is greater than the depth of the cavity. Thus, when pressure is applied, as shown in Figure 9, the material in the neck is reformed and compressed to provide a shortened, but thickened, threaded neck as shown in Figures 9 and 11. At the same time, the folds of the shoulder are subjected to pressure, the spindle 12 serving, however, as a limit stop to prevent application of excessive pressure thereto. In order to provide adequate strength, the thickening of the neck should be substantial, i. e. in the finished tube the wall thickness of the neck should be several times the wall thickness of the tubular body portion of the tube.

In many cases, the application of pressure alone is sufficient to compress the overlapping folds of the shoulder and neck so tightly as to resist subsequent separation of the folds, and to maintain the conformation of the shoulder and the threaded neck during ordinary usage of the tube. However, when using thermoplastic or heat sealing materials, the die 15 may, if desired, be heated in any suitable manner, as by a suitable electrical heating element or by steam, with provision for temperature control at the required level for sealing the selected material, and with provision for cooling the die prior to removing the finished tube from the die.

With the application of suitable pressure, or heat and pressure as above described, the shortened, thickened neck assumes a strength and rigidity approaching that of extruded tubes made of metals such as tin. After the pressure is released, the tube is removed from the die by unscrewing the same, or, if the die is made of two matching parts, the tube may be removed by separating the die parts.

The resulting tube is admirably suited for use as a collapsible tube, for the cylindrical wall is thin and flexible, while the shoulder, due to the folds which provide increasing thickness from the periphery to the juncture with the neck, possesses sufficient rigidity to hold its shape under ordinary usage. Finally, the shortened, thickened tubular neck as reformed and compressed possesses substantial strength and rigidity, and when provided with a thread as illustrated, is adapted to receive the ordinary threaded cap as ordinarily used as a closure for metal collapsible tubes.

It will be understood that the invention may be

I claim as my invention:

1. The method of making a collapsible tube from sheet material which comprises shaping a tubular blank of such material to provide an embryo tube having a shoulder and an elongated tubular neck integral with the tubular body and consisting of folded material, and subjecting the entire end surface of said elongated tubular neck to longitudinal pressure to compress and compact the neck material and to shorten and thicken the same to provide a finished neck of substantial strength and rigidity.

2. The method of making a collapsible tube from sheet material which comprises shaping a tubular blank of such material to provide an embryo tube having a shoulder and an elongated tubular neck integral with the tubular body and consisting of folded material, placing said elongated tubular neck in an internally threaded die cavity, and subjecting the entire end surface of said elongated tubular neck to longitudinal pressure to compress and compact the neck material and to shorten and thicken the same and to force the neck material into the threads of the die cavity to provide a finished threaded neck of substantial strength and rigidity.

3. The method of making a collapsible tube from sheet material which comprises twisting a portion of a tubular blank of such material to provide an embryo tube having a shoulder and elongated tubular neck integral with the tubular body and consisting of spirally wound folded material, and subjecting the entire end surface of said elongated tubular neck to longitudinal pressure to compress and compact the neck material and to shorten and thicken the same to provide a finished neck of substantial strength and rigidity.

4. The method of making a collapsible tube from sheet material which comprises internally supporting a portion of a cylindrical tubular blank of such material while leaving another portion unsupported, shaping the unsupported portion of said blank to form a shoulder and elongated tubular neck consisting of folded material, and subjecting the entire end surface of said elongated tubular neck to longitudinal pressure to compress and compact the neck material to shorten and thicken the same to provide a finished neck of substantial strength and rigidity.

5. The method of making a collapsible tube from sheet material which comprises internally supporting a portion of a cylindrical tubular blank of such material while leaving another portion unsupported, puckering said unsupported portion inwardly, intercepting said puckering movement by means of an axial spindle, folding said puckered material along said spindle to form an elongated tubular neck, and subjecting the entire end surface of said elongated tubular neck to longitudinal pressure to compress and compact the neck material to shorten and thicken the same to provide a finished neck of substantial strength and rigidity.

6. The method of making a collapsible tube from sheet material which comprises internally supporting a portion of a cylindrical tubular blank of such material while leaving another portion unsupported, rotating one end portion of said blank relative to the other to twist the unsupported portion to cause the same to pucker inwardly, intercepting the inward puckering movement by means of an axial spindle, continuing the rotation of one end portion of said blank relative to the other to cause unsupported material to wind about said spindle to form a spirally wound elongated tubular neck, and subjecting said elongated tubular neck to longitudinal pressure to compress the neck material to shorten and thicken the same to provide a finished neck of substantial strength and rigidity.

7. The method of making a collapsible tube from sheet material which comprises internally supporting a portion of a cylindrical tubular blank of such material while leaving another portion unsupported, rotating one end portion of said blank relative to the other to twist the unsupported portion to cause the same to pucker inwardly, intercepting the inward puckering movement by means of an axial spindle, continuing the rotation of one end portion of said blank relative to the other to cause unsupported material to wind about said spindle to form a spirally wound elongated tubular neck of a length in excess of that desired in the finished tube and of a wall thickness less than that desired in the finished tube, and subjecting said elongated tubular neck to longitudinal pressure to shorten and thicken the same and to compress the material in the neck to provide substantial strength and rigidity.

8. The method of making a collapsible tube from sheet material which comprises internally supporting a portion of a cylindrical tubular blank of such material while leaving another portion unsupported, rotating one end portion of said blank relative to the other to twist the unsupported portion to cause the same to pucker inwardly, intercepting the inward puckering movement by means of an axial spindle, and continuing the rotation of one end portion of said blank relative to the other to cause unsupported material to wind about said spindle to form a spirally wound tubular neck.

9. The method of making collapsible tubes from sheet material which comprises internally supporting a cylindrical tubular blank of such material along circumferential portions of each end thereof, while leaving an intermediate portion of said blank unsupported, puckering said unsupported portion inwardly, intercepting said puckering movement by means of an axial spindle, folding said puckered material along said spindle to form an elongated tubular neck, and cutting through the tubular neck near the middle thereof to provide an embryo tube on either side of the cut.

10. The method of making a collapsible tube from sheet material which comprises internally supporting a cylindrical tubular blank of such material on a pair of aligned spaced mandrels, rotating one of said mandrels relative to the other while holding said blank against circumferential slippage on said mandrels, and moving said mandrels longitudinally toward and away from each other during said rotating movement.

11. The method of making a collapsible tube from sheet material which comprises internally supporting a cylindrical tubular blank of such material on a pair of aligned spaced mandrels, rotating one of said mandrels relative to the other while holding said blank against circumferential slippage on said mandrels, and moving said mandrels longitudinally toward each other during said rotating movement.

BORIS BOGOSLOWSKY.